(12) United States Patent
Runtemund et al.

(10) Patent No.: US 11,977,163 B2
(45) Date of Patent: May 7, 2024

(54) CIRCUIT FOR BACKGROUND LIGHT SUPPRESSION

(71) Applicants: IFM Electronic GmbH, Essen (DE); PMDTechnologies AG, Siegen (DE)

(72) Inventors: Peter Runtemund, Siegen (DE); Carl Philip Heising, Wilnsdorf (DE)

(73) Assignees: IFM Electronic GmbH, Essen (DE); PMDTechnologies AG, Siegen (DE)

( * ) Notice: Subject to any disclaimer, the term of this patent is extended or adjusted under 35 U.S.C. 154(b) by 0 days.

(21) Appl. No.: 18/265,966

(22) PCT Filed: Dec. 9, 2021

(86) PCT No.: PCT/EP2021/084942
§ 371 (c)(1),
(2) Date: Jun. 7, 2023

(87) PCT Pub. No.: WO2022/122892
PCT Pub. Date: Jun. 16, 2022

(65) Prior Publication Data
US 2023/0393279 A1 Dec. 7, 2023

(30) Foreign Application Priority Data
Dec. 11, 2020 (DE) .......................... 102020133193.2

(51) Int. Cl.
*G01C 3/08* (2006.01)
*G01S 7/4914* (2020.01)
(Continued)

(52) U.S. Cl.
CPC .......... *G01S 17/894* (2020.01); *G01S 7/4914* (2013.01); *G01S 7/4915* (2013.01)

(58) Field of Classification Search
CPC ..... G01S 17/894; G01S 7/4914; G01S 7/4915
See application file for complete search history.

(56) References Cited

U.S. PATENT DOCUMENTS

| 2010/0301193 | A1* | 12/2010 | Guellec | G01S 17/894 |
| | | | | 250/214 R |
| 2017/0339361 | A1 | 11/2017 | Gancarz | |
| 2020/0233064 | A1* | 7/2020 | Davidovic | H01L 31/02027 |

FOREIGN PATENT DOCUMENTS

| DE | 102005056774 A1 | 5/2007 |
| DE | 102011089642 A1 | 6/2012 |

(Continued)

*Primary Examiner* — Mark Hellner
(74) *Attorney, Agent, or Firm* — Patent Technologies, LLC; Robert D. Gunderman, Jr.

(57) ABSTRACT

Described is a circuit for background light suppression (SBI, 500) for a light propagation time sensor (22) which operates according to a phase measuring principle and the light propagation time pixels of which have integration nodes or diodes (Ga, Gb, diode_a, diode_b) for the accumulation of charges, having an input stage (50), an operational amplifier (OP) and an SBI current source (SQ), wherein the input phase (50) has bypass and common mode circuits (SBP, SVcm) via which signals of the integration nodes (Ga, Gb, diode_a, diode_b) are guided to the operational amplifier (OP) and via which the operational amplifier (OP) can be switched to a maximum detection or common mode operation, wherein the operational amplifier (OP) is designed such that based on the signals of the integration nodes (Ga, Gb, diode_a, diode_b) switched by the input stage (50) to the operational amplifier (OP), a gate voltage (gate_cs) is generated for the SBI current source (SQ), wherein the SBI current source (SQ) has a first current source (SQ1) for the maximum detection operation and a second and third current source (SQ2*a*, SQ2*b*) for the common mode operation wherein the current sources (SQ1, SQ2*a*, SQ2*b*) can be connected via switches (S) to integration nodes (Ga, Gb, diode_a, diode_b).

10 Claims, 7 Drawing Sheets

(51) Int. Cl.
*G01S 7/4915* (2020.01)
*G01S 17/894* (2020.01)

(56) References Cited

FOREIGN PATENT DOCUMENTS

| | | | | |
|---|---|---|---|---|
| DE | 102018132683 A1 | * | 6/2020 | ....... H01L 27/14607 |
| EP | 3712649 A1 | | 9/2020 | |
| WO | WO2016016018 A1 | | 2/2016 | |
| WO | WO 2022122892 A1 | * | 6/2022 | ........... G01S 7/4914 |

* cited by examiner

CIRCUIT FOR BACKGROUND LIGHT SUPPRESSION

BACKGROUND OF THE INVENTION

1. Field of the Invention

The invention relates to a circuit for background light suppression.

2. Description of Related Art

The term light propagation tint e or time-of-flight camera or time-of-flight camera system is herein intended to include, in particular, systems that obtain distances from the phase shift of emitted and received radiation. In particular, PMD cameras with photomixing detectors (PMD) are suitable as time-of-flight or TOF cameras, as described, for example, in DE 197 04 496 A1.

From DE 10 2004 016 626 A1, DE 10 2005 056 774 A1 and DE 10 2014 214 733 A1, moreover, so-called SBI (suppressed background illumination) circuits are known, which extend the dynamics of a pixel by suppressing background light individually for each pixel.

It is an object of the invention to optimize a circuit for background light suppression with respect to functionality and space-saving arrangement.

The object is achieved by the circuit according to the invention.

BRIEF SUMMARY OF THE INVENTION

According to the invention, a circuit for background light suppression is provided for a time-of-flight sensor which operates according to a phase measurement principle and whose time-of-flight pixels comprise integration nodes or diodes for accumulating charges, comprising an input stage, an operational amplifier and an BI current source, wherein the input stage comprises bypass and common mode switches via which signals from the integration nodes are supplied to the operational amplifier and via which the operational amplifier can be switched to a maximum detection or a common mode operation, wherein the operational amplifier is configured in such a way that, on the basis of the signals of the integration nodes switched to the operational amplifier via the input stage nodes a gate voltage for the SBI current source is produced, wherein the SBI current source comprises a first current source for the maximum detection mode and a second and a third current source for common mode operation, wherein the current so Hoes are connectable to integration nodes via switches.

This SBI circuit has the advantage that a suitable SBI mode can always be found for different applications.

Advantageously, the second current source is configured as a low-current source and the third current source as a high-current source.

This approach has the advantage that different compensation currents can be used depending on the background light present.

It is particularly useful if the operational amplifier has a differential input stage and a second branch consisting of a transistor connected to an SBI threshold voltage, wherein, depending on the operating mode, the inputs pa and pb are either connected together to the common mode voltage or separately to the diode voltages.

Likewise, it is advantageous to provide a time-of-flight pixel with an aforementioned circuit for background light suppression and to construct a time-of-flight sensor with corresponding time-of-flight pixels.

It is also useful to provide a time-of-flight camera comprising an abovementioned circuit or a plurality of the aforementioned time-of-flight pixels, and in particular it is advantageous to design the time-of-flight camera for a TOF operation and for a combined TOF and triangulation operation, wherein the background light suppression is performed in the maximum detection mode and in the TOF and triangulation operation in the common mode operation.

The time-of-flight camera is suitably configured in such a way that, in the common mode operation, a switchover between the second and the third current source is performed as a function of extraneous light incident on the time-of-flight sensor.

This procedure enables advantageously to respond adequately to different conditions of application, so that a safe operation of the time-of-flight camera is permanently guaranteed.

DESCRIPTION OF THE PREFERRED EMBODIMENTS

In the following description of the preferred embodiments, identical reference symbols denote identical or comparable components.

Figure 1:
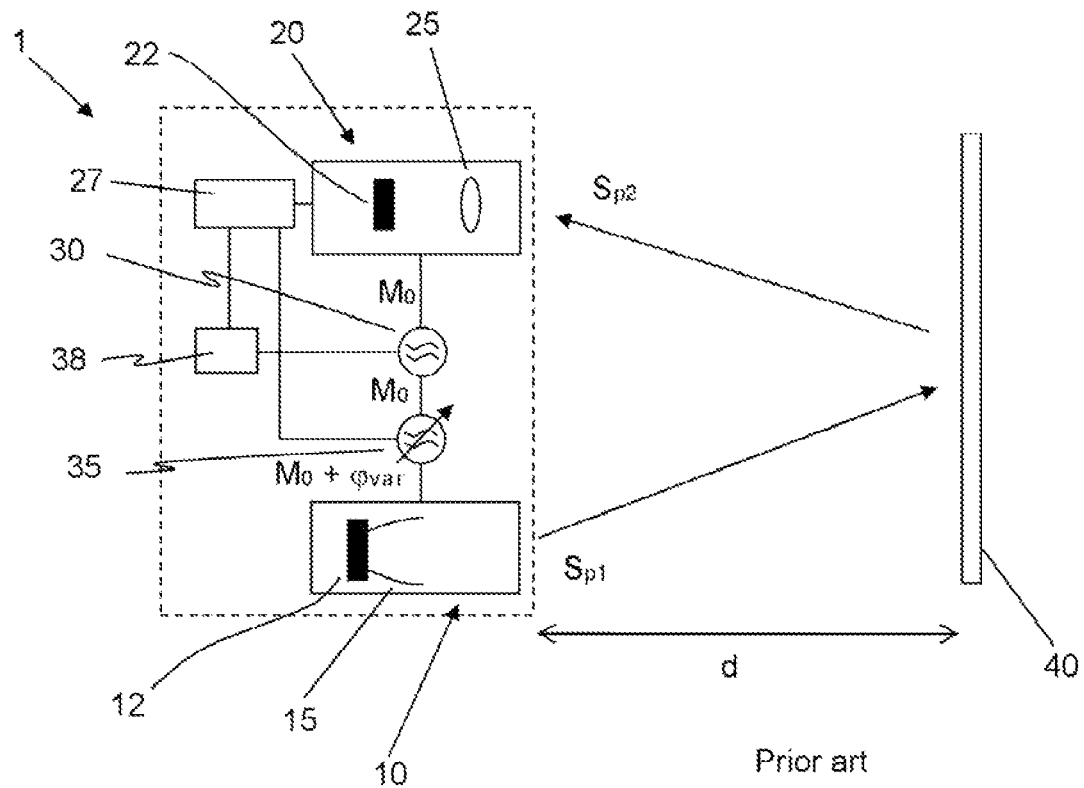
FIG. 1 a time-of-flight camera system.

FIG. 1 shows a measurement situation for an optical distance measurement by use of a time-of-flight camera, as known for example from DE 197 04 496 A1.

The time-of-flight camera system 1 comprises an emission unit or illumination module 10 comprising an illumination 12 and an associated beam shaping optics 15, and a receiving unit or time-of-flight camera 20 comprising a receiving optics 25 and a time-of-flight sensor 22.

The time-of-flight sensor 22 comprises at least one time-of-flight pixel, preferably also a pixel array and is in particular configured as a PMD sensor. The receiving optics 25 typically consists of several optical elements in order to improve the imaging properties. The beam shaping optics 15 of the emission unit 10 can, for example, be configured as a reflector or lens optics. In a very simple embodiment, it may also be possible to dispense with optical elements on both the receiving and emission sides.

The measuring principle of this arrangement is essentially based on the fact that, starting from the phase shift of the emitted and received light, the propagation time and thus the distance traveled by the received light can be determined. For this purpose, the light source 12 and the time-of-flight sensor 22 are jointly supplied with a certain modulation signal $M_0$ having a base phase position $\varphi_0$ via a modulator 30. In the example shown, a phase shifter 35 is further provided between the modulator 30 and the light source 12, by means of which the base phase $\varphi_0$ of the modulation signal $M_0$ of the light source 12 can be shifted by defined phase positions $\varphi_{var}$. For typical phase measurements, phase positions of ($p_v$=0°, 90°, 180° and 270° are preferably used.

According to the set modulation signal, the light source 12 emits an intensity modulated signal $S_{p1}$ with the first phase position p1 or p1=$\varphi_0$+$\varphi_{var}$. This signal $S_{p1}$ or the electromagnetic radiation is reflected by an object 40 in the case shown and hits the time-of-flight sensor 22 due to the distance traveled accordingly with a phase shift $\Delta\varphi(t_L)$ with a second phase position p2=$\varphi_0$+$\varphi_{var}$$\Delta\varphi(t_L)$ as a received signal $S_{p2}$. In the time-of-flight sensor 22 the modulation signal $M_0$ is mixed with the received signal $S_{p2}$, wherein the phase shift or the object distance d is determined from the resulting signal.

Furthermore, the system comprises a modulation controller 27 which, depending on the measurement task at hand, changes the phase position $\varphi_{var}$ of the modulation signal $M_0$ and/or adjusts the modulation frequency via a frequency oscillator 38.

Preferably, the illumination source or light source 12 is/are infrared light emitting diodes. Of course, other radiation sources in other frequency ranges are conceivable, in particular light sources in the visible frequency range.

Figure 2:
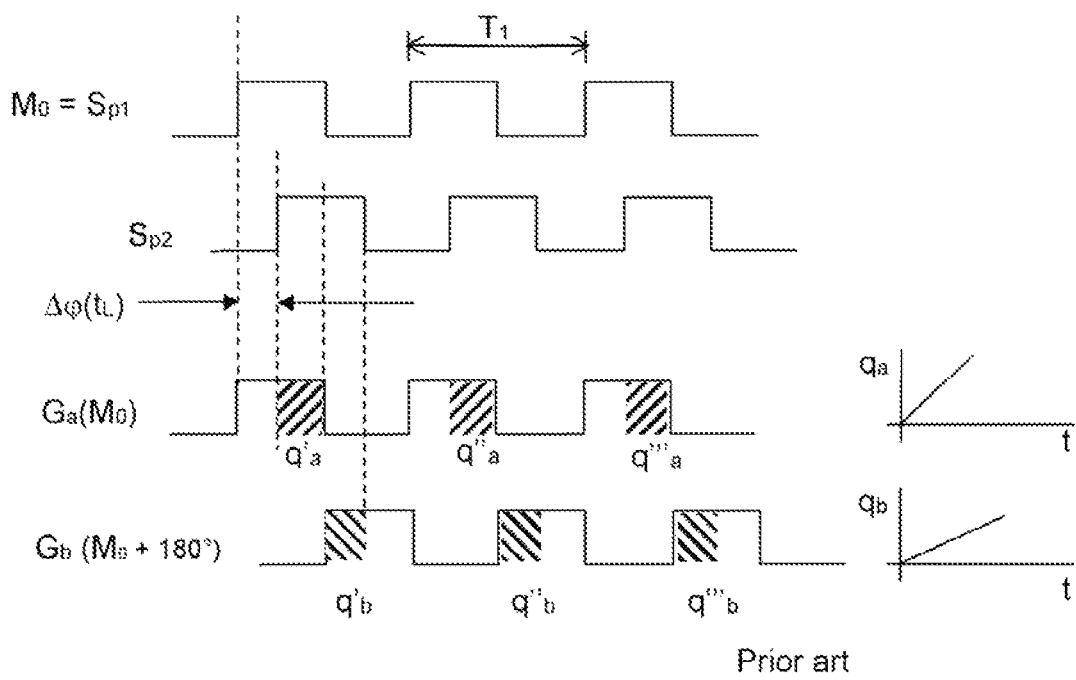
FIG. 2 a modulated integration of generated charge carriers.

The basic principle of phase measurement is shown schematically in FIG. 2. The upper curve shows the temporal course of the modulation signal $M_0$ with which the illumination 12 and the time-of-flight sensor 22 are driven. The light reflected by the object 40 hits the time-of-flight sensor 22 as a received signal $S_{p2}$ with a phase shift $\Delta\varphi(t_L)$ according to its time-of-flight tk. The time-of-flight sensor 22 accumulates the photonically generated charges q over several modulation periods in the phase position of the modulation signal $M_0$ in a first accumulation gate Ga and in a phase position $M_0$+180° shifted by 180° in a second accumulation gate Gb. From the ratio of the charges qa, qb accumulated in the first and second gates Ga, Gb, the phase shift d$\varphi(t_L)$ and thus a distance d of the object can be determined.

Figure 3:
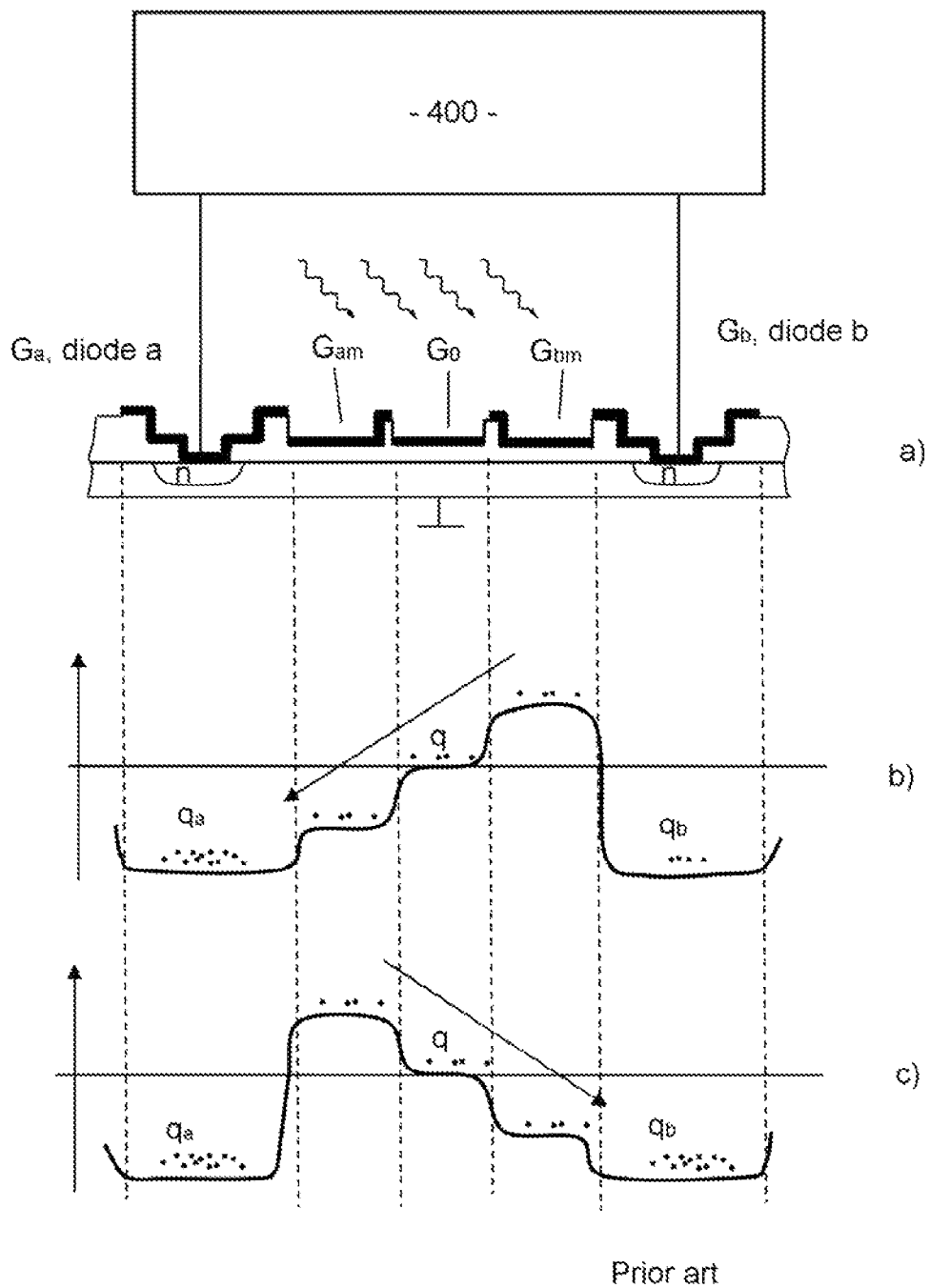
FIG. 3 a cross-section through a PMD time-of-flight sensor with a potential distribution.

FIG. 3 shows a cross-section through a pixel of a photomixing detector as known, for example, from DE 197 04 496 C2. The modulation photogates Gam, G0, Gbm form the light sensitive area of a PMD pixel. According to the voltage applied to the modulation gates Gam, G0, Gbm, the photonically generated charges q are directed either to one or to the other accumulation gate/integration node Ga, Gb or diode diode_a, diode_b, respectively. The integration nodes can be configured as gates or as diodes.

FIG. 3b shows a potential curve in which the charges q flow in the direction of the first integration gate Ga, while the potential according to FIG. 3c allows the charges q to flow in the direction of the second integration node Gb. The potentials are predetermined according to the modulation signals applied. Depending on the application, the modulation frequencies are preferably in a range from 1 to 100 MHz. A modulation frequency of 1 MHz, for example, results in a time period of one microsecond, so that the modulation potential changes accordingly every 500 nanoseconds.

FIG. 3a also shows a readout unit 400, which may already be part of a PMD time-of-flight sensor configured in the form of a CMOS. The integration nodes Ga, Gb, which are in the form of capacitors or diodes, integrate the photonically generated charges over a plurality of modulation periods. In a known manner, the voltage then provided at the gates Ga, Gb can be tapped at high impedance, for example, via the readout unit 400. The integration times are preferably to be selected in such a way that for the expected amount of light the time-of-flight sensor or the integration nodes and/or the light-sensitive areas do not incur saturation.

Figure 4:
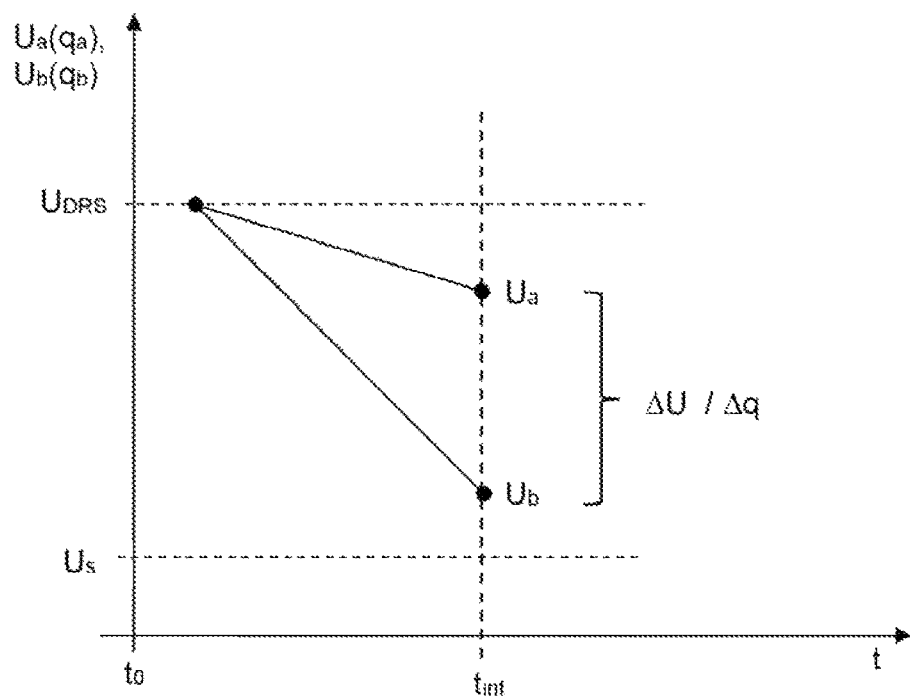
FIG. 4 the integration voltages at a time-of-flight pixel over time.

FIG. 4 shows a typical time characteristic of the voltage $U_a$, $U_b$ provided at the integration nodes Ga, Gb during a phase measurement. Starting from a positive reset voltage $U_{DRS}$ provided at the integration nodes after a reset, the voltage drops due to the accumulated photoelectrons at both integration nodes Ga, Gb. According to the phase shift $\Delta\varphi(t_L)$ of the received signal, the voltages at the integration nodes Ga, Gb drop to different degrees. At the end of the integration time $t_{int}$, the voltage $U_a$, $U_b$ provided at the integration nodes Ga, Gb is read out. The voltage difference $\Delta U$ of the two voltages $U_s$, $U_b$ corresponds in a known way to the difference $\Delta q$ of the charge q accumulated at the integration nodes Ga, Gb. The integration time $t_{int}$ is preferably such that no integration node Ga, Gb reaches its saturation potential $U_s$ during a usual exposure. For larger signal strengths, a so-called SBI circuit can be provided for signal compensation. Such circuits are known, for example, from DE 10 2004 016 626 A1 or DE 10 2005 056 774 A1.

Figure 5:
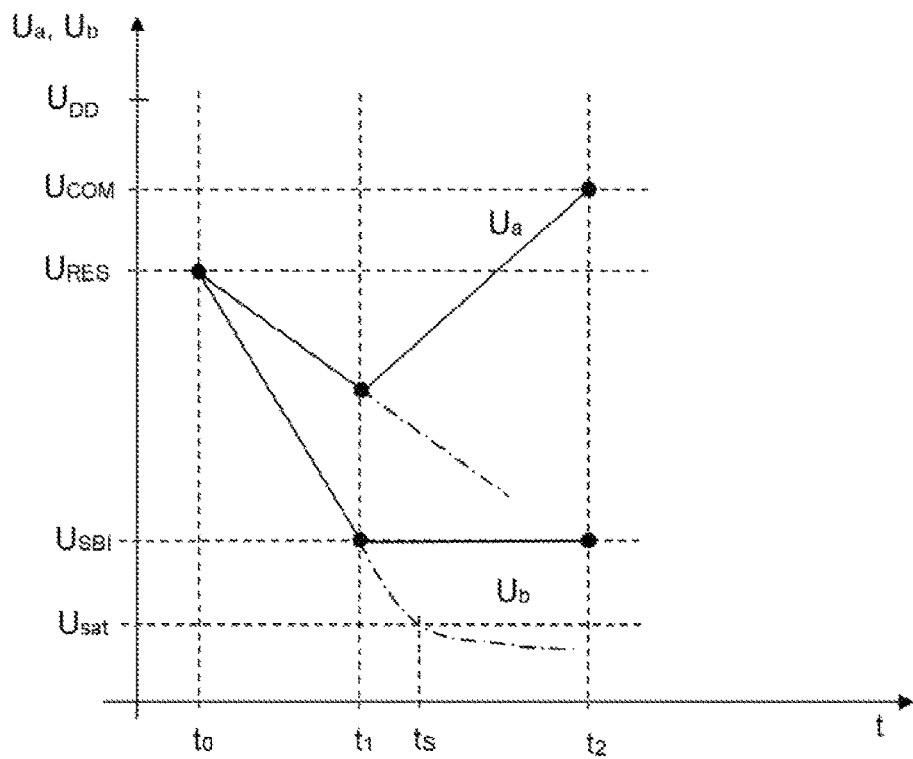
FIG. 5 a potential curve at a time-of-flight pixel with and without use of SBI.

FIG. 5 shows a possible course of the signal $U_s$, $U_b$ provided at the integration nodes Ga, Gb and diodes a, b, respectively, during a measurement. After a reset, a reset voltage $U_{RES}$ with a positive potential is provided at the integration nodes Ga, Gb. In the example shown, the charge compensation should not yet be effective at the start of the measurement at the start time $t_0$. With increasing number of collected charge carriers or photoelectrons, the voltage $U_a$, $U_b$ at the integration nodes Ga, Gb decreases.

If the charges at the integration nodes Ga, Gb are not compensated in the further course, the potential $U_a$, $U_b$ at the integration nodes Ga, Gb drops further, as shown by a dashed line. In the case shown, the second integration node Gb reaches a saturation potential $U_{sat}$ at a saturation time $t_s$, after which the integration node saturates and the phase reference of the accumulated charge or voltage provided is lost. Saturation occurs when either no further charge carriers can be accumulated due to an insufficient potential gradient in the semiconductor or when the readout range of the readout device 400 is left. Distance values determined after this point in time are erroneous.

In order to prevent or delay such saturation, it is known, for example, from DE 10 2005 056 774 A1 to implement a charge compensation at both integration nodes Ga, Gb as soon as one integration node Ga, Gb reaches an SBI potential limit value $U_{SBI}$, in this case at a first point in time $t_1$. Charge compensation is performed by applying a compensation current $i_k$ to both integration nodes Ga, Gb. The compensation current $i_k$ can be determined, for example, from the slope of the larger potential drop from (Ua, Ub) and, if necessary, adjusted with a compensation factor k.

$$i_k = C_{im} \cdot \frac{\Delta U}{\Delta t} \cdot k$$

It is also possible to provide the compensation current $i_k$ as a function of an electrical variable $i_a$, $i_b$, $U_a$, $U_b$ provided at an integration node Ga, Gb, preferably via a control system. Such control systems are known, for example, from DE 10 2004 016 626 A1 and in particular DE 10 2005 056 774 A1, which are expressly referred to herein, in various variants. Such a control system is characterized in that the compensation current $i_k$ is specified by the control system in such a way that the integration node at which the SBI potential limit value $U_{SBI}$ is reached first is kept constant in potential.

Such a procedure is shown in FIG. 5 with the solid line. The accumulation of the charges takes place as described above initially without the application of a compensating current $i_k$. In the example shown, the second integration node Gb has the largest potential drop and is the first to reach the SBI potential limit value $U_{SBI}$. By use of the SBI control system, it is now possible to set the compensation current $i_k$ in such a way that the potential at this integration node Gb is kept essentially constant. The first integration node Ga is supplied with a compensation current $i_k$ of the same magnitude and is thus quasi overcompensated, so that the potential increases with the start of compensation. This overcompensation can continue until the first integration node Ga reaches a base potential $U_{com}$, which is essentially predetermined by circuit design.

Figure 6:
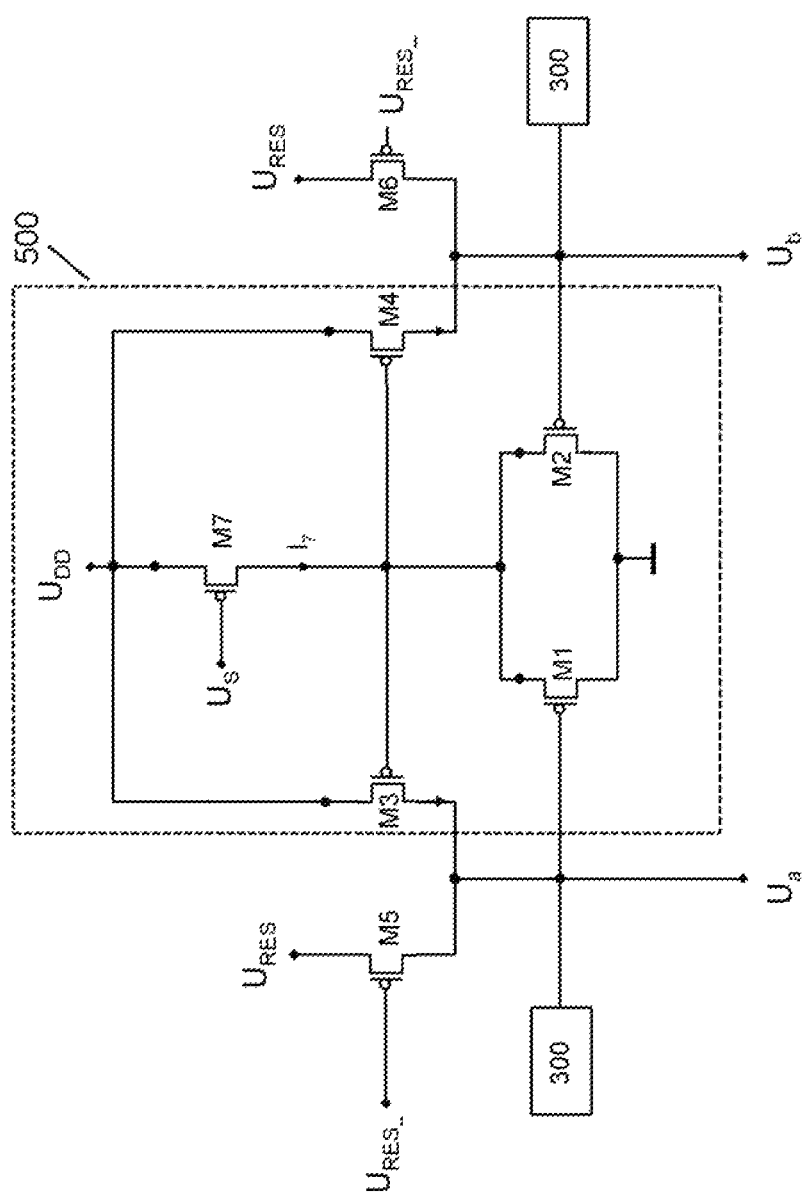
FIG. 6 a circuit for charge compensation known from the prior art.

FIG. 6 shows an example of an SBI circuit 500 for charge compensation already known from DE 10 2005 056 774 A1. Preferably, the SBI circuit 500 is an integral part of the readout device 400. In principle, however, a design independent of the readout device 400 is also conceivable. The illustrated switches or transistors M1-M7 are designed as PMOS transistors in the present example and also in the following examples.

Of course, the embodiments are not limited to PMOS structures, but can in particular also be designed as NMOS structures. In the circuits, only the potential assignments change. In an NMOS design, the supply voltage is at a negative GND potential instead of a positive $U_{DD}$ potential, and the reference potential is at $U_{DD}$. The relations with respect to the other potentials change accordingly.

The SBI circuit 500 forms in combination with a control transistor M7 and a first and a second input transistor M1, M2 a source follower with double input by means of which a first and a second SBI current transistor M3, M4 are driven At the start of a measurement, the gate potentials are typically set so that the transistors M1 to M6 are closed. A control voltage $U_S$ is preferably already present at the gate of transistor M7. However, no current flows through transistor M7 because the transistors M1 and M2 are still closed.

The source terminals of the transistors M3, M4, and M7 are connected to the supply voltage Uno. A reset potential $U_{RES}$ is provided at the source terminals of the reset transistors M5, M6 and the gates can be driven with a reset switching potential $U_{RES\_N}$.

The potentials $U_a$, $U_b$ of the integration nodes Ga, Gb are respectively connected to a storage device 300, which is preferably configured as a source follower. In addition, the potential $U_a$, $U_b$ of the integration nodes Ga, Gb is also provided at the gates of the SBI input transistors M1, M2.

If during a measurement the SBI threshold $U_{SBI}$ is not reached by any of the integration nodes Ga, Gb, the SBI input transistors M1 and M2 and the SBI current transistors M3 and M4 remain closed and there is no charge compensation. After the measurement is completed, the integration nodes Ga, Gb are connected to the reset potential $U_{RES}$ via the reset switches M5, M6, by applying a reset switching signal $U_{RES\_N}$, and the integration nodes Ga, Gb are reset to this potential.

If during an integration the voltage $U_a$, $U_b$ at one of the integration nodes Ga, Gb reaches the SBI threshold $U_{SBI}$, one of the SBI input transistors M1 or M2 is turned on, so that a current $I_7$ flows via the control transistor M7 from $U_{DD}$ towards ground GND. The input transistor M1, M2 with the lower gate potential determines the output voltage of the source follower. The output voltage is used to drive both SBI current transistors M3, M4, which then quasi as a current source supply both integration nodes Ga, Gb with a compensation current $i_k$ of same magnitude.

When the SBI threshold is reached, the compensation current $i_k$ is equal in amount to the photocurrent of the deeper channel or integration node Ga, Gb, which has reached the SBI threshold first. If, as shown in FIG. 5, the second integration node Gb reaches the SBI threshold $U_{SBI}$ first, the second switching transistor M2 determines the output voltage of the source follower and therefore the compensation current $i_k$.

The SBI switching threshold $U_{SBI}$ is freely selectable within certain specifications and depends mainly on the following factors.

$$U_{SBI} = U_S - |U_{th\_min\_a,b}| - n \cdot U_T \cdot \ln\frac{I_{ph}}{I_{0\_M3,4}},$$

wherein $U_S$: control voltage, $U_{th\_min\_a,b}$: effective SBI threshold voltage at the SBI input transistors M1, M2; n: technology-dependent fit parameter, UT: temperature dependent voltage component; $I_{0\_M3,4}$: transfer current across transistor M3 or M4.

The drain current $I_D$ or compensation current $i_k$ via the SBI current transistors M3, M4 results in a known manner from.

$$I_D = I_0 \cdot \exp\left(\frac{|U_{GS}| - |U_{th}|}{n \cdot U_T}\right),$$

wherein $I_0$: transfer current at transistor, $U_{GS}$: gate-source voltage, $U_{th}$: threshold voltage, $U_T$: temperature dependent voltage component.

The SBI inset threshold $U_{SBI}$ is mainly determined by the dimensioning of the SBI and pixel circuit in the chip design. In the ready-to-use state, the only parameter available for adjusting the SBI threshold $U_{SBI}$ is essentially the control voltage $U_S$ at transistor M7. Due to the interaction with the other potentials, however, it is variable only within certain limits. A small change in $U_S$ is typically accompanied by a large change in the source current (subthreshold region). This leads to a modification of the control characteristics of the SBI circuit and can lead in particular for large pixel matrices to an unacceptable increase in the total current consumption due to an increase of the drain current r. Thus, the adjustment of the SBI threshold Uses via the control voltage $U_S$ is only reasonably possible within small limits.

Typically, SBI circuits are designed either as maximum detectors, as presented hereto before, or as common mode SBI and usually comprise generally a limited extraneous light current range.

The background light suppression circuit or SBI circuit according to the invention combines both functionalities, maximum detector as well as common mode, and significantly extends the extraneous light current range of the switchable current sources used.

The SBI circuit according to the invention is especially suitable for different extraneous light situations, from little extraneous light to direct extraneous light, and can therefore also be used under difficult operating conditions, for example with direct extraneous light irradiation at a short distance.

Figure 7:
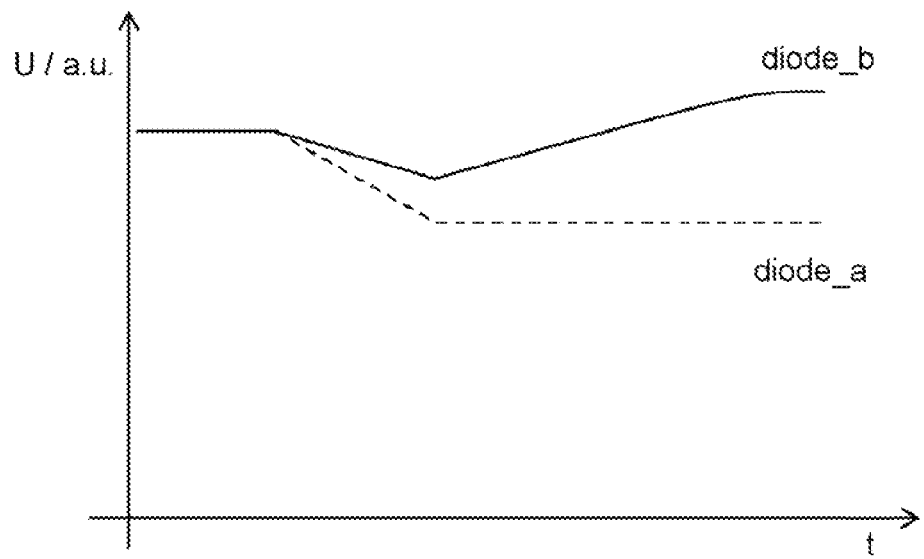
FIG. 7 a voltage curve of a maximum detector SBI.
Figure 8:
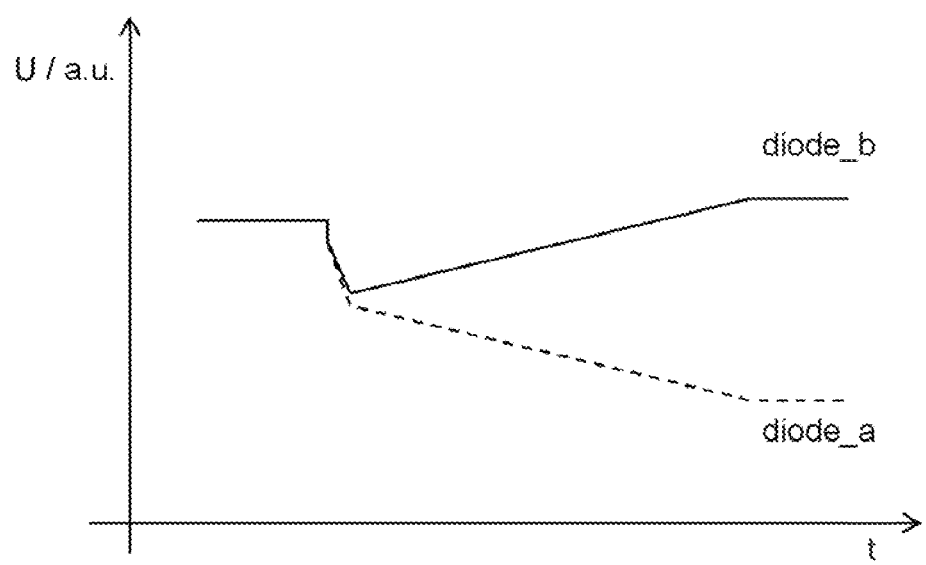
FIG. 8 a voltage curve of a common mode SBI.

FIGS. 7 and 8 show the voltage characteristics at the two diode nodes diode_a and diode_b for a maximum detector operation (FIG. 7) and a common mode operation (FIG. 8).

Figure 9:
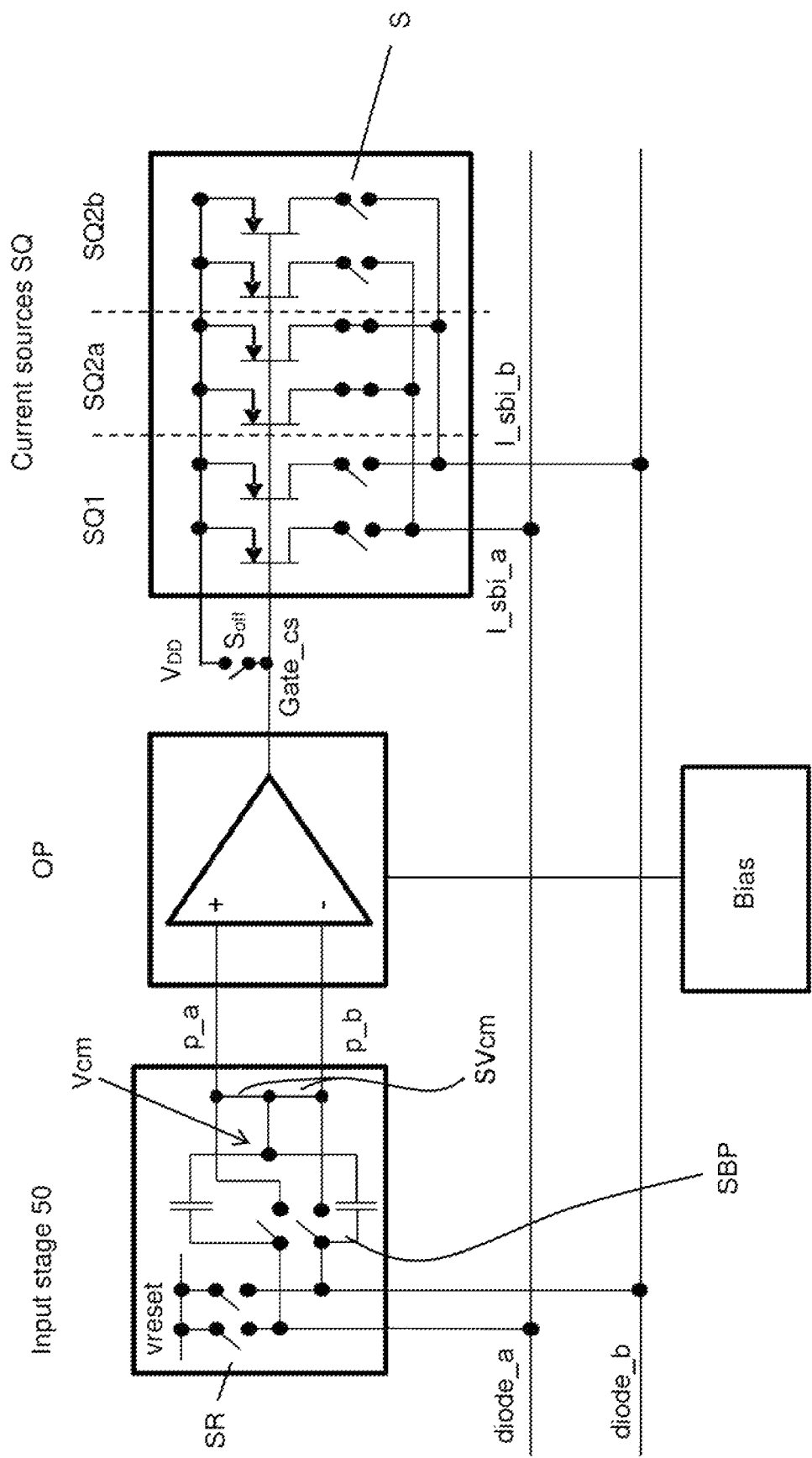
FIG. 9 a block diagram of a circuit according to the invention.

The advantage of the SBI circuit according to the invention as shown in FIG. 9 is that the operational amplifier OP can be used both for a maximum detector and a common mode operation. Switching between the two functions is done by switching the input transistors or the input switches SE of the operational amplifier OP in the input stage 50.

This eliminates the need for two separate circuits, thus reducing the space required on the chip and the current consumption.

In addition, the SBI circuit presented has a wide dynamic range, because it is suitable both for high and low extraneous light currents due to the switchable current sources SQ.

By switching the SBI current sources SQ, the corresponding current range can be selected. In addition, the SBI circuit can be switched between maximum detector and common mode operation by an external signal.

The possible extraneous light current range for the maximum detector operation is fixed and lies, for example, between 1 nA and 1 µA.

In the common mode operation, the current range can be changed by changing the current sources. For example, a low current source SQ2*a* can be provided for a current range of 50 nA to 10 µA and a high current source SQ2*b* can be provided for a range of 1 µA to 100 µA.

Due to the different current ranges, moreover, a different dimensioning of the current source transistors is advantageous. For low currents, the gates should preferably be designed with a small width and a greater length. Such a dimensioning prevents the transistors from entering a sub-threshold region.

For larger currents, the width should be larger and the gate length should be smaller in order to prevent the transistor from reaching saturation at low operating voltage. At the same time, the control of the transistors by the operational amplifier OP and the stability of the control loop must be taken into account for all current ranges.

As shown in FIG. 9, the SBI circuit 500 basically consists of three components, namely an input stage 50, an operational amplifier OP and an SBI current source SQ with switchable current sources SQ1, SQ2*a* and SQ2*b*.

The input stage 50 includes two reset switches SR, preferably two PMOS switches that pull the two diode nodes diode_a and diode_b to the defined reset voltage vreset when the SBI circuit 500 is in the reset mode.

If the common mode operation is activated, as shown in FIG. 9, then the common mode voltage Vcm is derived via two capacitances in the input stage from the two diode voltages diode_a and diode_b and is forwarded evenly via two common mode switches SVcm to the inputs p_a and p_b of the operational amplifier OP.

If the maximum detector operation is selected, two bypass transistors/switches SBP are activated, which switch the diode voltages diode_a and diode_b individually to the inputs p_a and p_b of the operational amplifier. The common mode switches SVcm are open in this case.

S The operational amplifier OP is used to generate the required loop gain for the control and to drive the SBI current sources SQ. The inputs p_a and p_b of the OPV are selectively switched to common mode or to the individual diode voltages diode_a and diode_b by the switches of the input stage.

The operational amplifier OP is preferably designed as a folded cascode operational amplifier with differential input stage. The OP circuit has an internal common mode feedback (CMFB), which drives the current sources of the folded cascode stage of the operational amplifier and thus controls the common mode.

The output stage of the operational amplifier OP preferably consists of a PMOS source follower which drives the gates of the SBI current sources SQ1, SQ2 and thereby adjusts the SBI currents I_sbi_a and I_sbi_b accordingly.

The generation of the bias voltages for the operational amplifier OP is preferably done externally in a separate bias block. This allows several SBIs to be biased simultaneously, which further reduces the area required and the current consumption.

The SBI current source SQ includes the SBI current sources SQ1 for the maximum detector operation and the SBI current sources SQ2*a* and SQ2*b* for the common mode operation, which provide the compensation currents I_sbi_a and I_sbi_b for the diodes diode_a, diode_b and thus compensate for the extraneous light current.

The gates of the current sources SQ1, SQ2*a*, SQ2*b* are driven by the output stage of the operational amplifier (PMOS source follower), whereby the compensation current I_sbi_a, I_sbi_b of the current sources is determined.

Due to the current requirements needed for the different applications, different current sources are used for the maximum detector SBI and the common mode SBI, which differ in gate size and current output. For the maximum detection operation, usually TOF applications are taken into account. The common mode operation is preferably suitable for a triangulation application with or without parallel TOF operation.

The current sources SQ2*a* and SQ2*b* of the Common mode SBI can be switched according to the situation (low or high extraneous light) between a small current source array of the low current source SQ2*a* for a low extraneous light situation and a large current source array of the high current source SQ2*b* for a high extraneous light situation.

This switching is typically not provided for the current sources SQ1 for the maximum detector operation, since here the extraneous light currents are usually much lower.

In power-down/switch-off or standby mode, the current sources (PMOS) are preferably de-energized by switching the gates to the operating voltage $V_{DD}$ via the switch Son, so that only low leakage currents flow. Further PMOS switches S with low leakage currents isolate the unused current sources from the diode nodes diode_a and diode_b, so that no undesired coupling occurs there between the maximum detector and the common mode SBI.

The SBI circuit presented here preferably also has a comparator (not shown here), which monitors either the common mode voltage Vcm or the gate voltage Gate_cs of the current sources and thus indicates when the SBI circuit is active. The reference voltage for the comparator is generated externally in a separate block.

With this architecture the most robust, low-noise and flexible SBI circuit is realized, which has a wide dynamic range and can deliver high currents even under difficult operating conditions. At the same time, the circuit is characterized by low current consumption and low SBI asymmetry.

Figure 10:
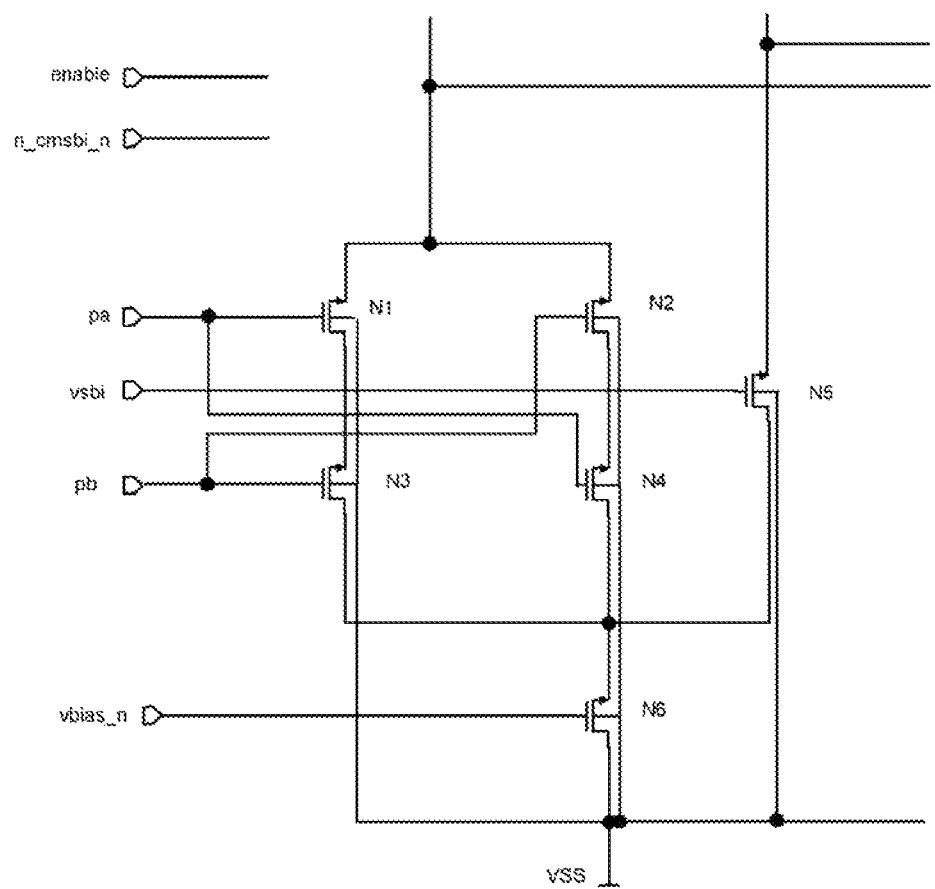
FIG. 10 an input stage of an operational amplifier.

Another aspect is the circuitry of the differential input stage of the operational amplifier. As shown in FIG. 10, the input stage consists of four transistors N1-N4, two of which are cross-connected (inputs pa and pb).

These four transistors form one branch of the differential input stage. The other branch consists of a transistor N5, whose gate is connected to the given SBI threshold voltage vsbi. Depending on the mode of operation (common mode or maximum detector), the inputs pa and pb are either connected together to the derived common mode Vcm or separately to the diode voltages diode_a and diode_b. By means of the cross-coupling of these four transistors, a high symmetry of the input stage is achieved, which ultimately leads to a low input offset of the circuit. A prerequisite for this is that this symmetry is also implemented accordingly in the layout.

LIST OF REFERENCE SYMBOLS

1 time-of-flight camera system
10 illumination, emitter
20 receiver, time-of-flight camera
12 light source
22 time-of-flight sensor
30 modulator
$\Delta\varphi(t_L)$ propagation time-related phase shift
$\varphi_{var}$ phase position
$\varphi_0$ base phase
$M_0$ modulation signal
p1 first phase
p2 second phase
Sp1 emission signal with first phase
Sp2 receiving signal with second phase
Ga, Gb integration nodes
$U_a$, $U_b$ voltages at the integration nodes
d object distance
300 storage device
400 readout circuit
500 SBI circuit, charge compensation device
$U_{com}$ base potential
$U_{SBI}$ SBI threshold
$U_{RES}$ reset voltage
$U_{RES\_N}$ reset switching potential
$U_{DD}$ supply voltage
$U_S$ control voltage
$U_{th}$ threshold voltage
$U_{sat}$ saturation potential
M1 . . . switches/transistors
M1, M2 SBI input transistors
M3, M4 SBI current transistors
M5, M6 reset switches
M7 control transistor
M8, M9 hold transistor

The invention claimed is:

1. A background light suppression circuit (SBI, 500) for a time-of-flight sensor (22) which operates according to a phase measurement principle and whose time-of-flight pixels comprise integration nodes or diodes (Ga, Gb, diode_a, diode_b) for accumulating charges;
comprising an input stage (50), an operational amplifier (OP) and an SBI c rent source (SQ),
wherein the input stage (50) comprises bypass and common mode switches (SBP, SVcm) via which signals of the integration nodes (Ga, Gb, diode_a, diode_b) are fed to the operational amplifier (OP) and via which the operational amplifier (OP) can be switched to a maximum detection or a common mode operation,
wherein the operational amplifier (OP) is configured such that, based on the signals of the integration node (Ga, Gb; diode_a, diode_b) switched to the operational amplifier (OP) via the input stage (50) a gate voltage (gate_cs) for the SBI current source (SQ) is generated,
wherein the SBI current source (SQ) comprises a first current source (SRI) for the maximum detection operation and a second and a third current source (SQ2a, SQ2b) for the common mode operation,
wherein the current sources (SRI, SQ2a, SQ2b) are connectable to integration nodes (Ga, Gb, diode_a, diode_b) via switches (5).

2. The background light suppression circuit according to claim 1, wherein the second current source (SQ2a) is configured as a low-current source and the third current source (SQ2b) is configured as high-current source.

3. The background light suppression circuit according to claim 1, wherein the operational amplifier comprises inputs pa and pb, a differential input stage and a second branch consisting of a transistor (N5) connected to an SBI threshold voltage (vsbi),
wherein, depending on the mode of operation, the inputs pa and ph are connected either jointly to the common mode voltage (Vcm) or separately to the diode voltages (diode_a, diode_b).

4. A time-of-flight pixel comprising the background light suppression circuit (500) according to claim 1.

5. A time-of-flight sensor comprising the background light suppression circuit according to claim 1.

6. A time-of-flight camera comprising the time-of-flight sensor according to claim 5.

7. The time-of-flight camera according to claim 6, which is configured for a TOF operation and for a combined TOF and triangulation operation,
wherein the background light suppression in the TOF operation takes place in the maximum detection operation, and in the TOF and triangulation operation in the common mode operation.

8. The time-of-flight camera according to claim 7, which is configured such that in the common mode operation a switchover between the second and the third current source (SQ2a, SQ2b) is implemented depending on extraneous light incident on the time-of-flight sensor.

9. A time-of-flight sensor comprising a plurality of time-of-flight pixels according to claim 4.

10. A time-of-flight camera comprising the time-of-flight sensor according to claim 9.

* * * * *